Sept. 19, 1933.   C. W. LAMBERT   1,927,592
PROPELLER HUB
Filed May 24, 1932   2 Sheets-Sheet 1

INVENTOR.
Chandley William Lambert

Sept. 19, 1933.  C. W. LAMBERT  1,927,592
PROPELLER HUB
Filed May 24, 1932  2 Sheets-Sheet 2
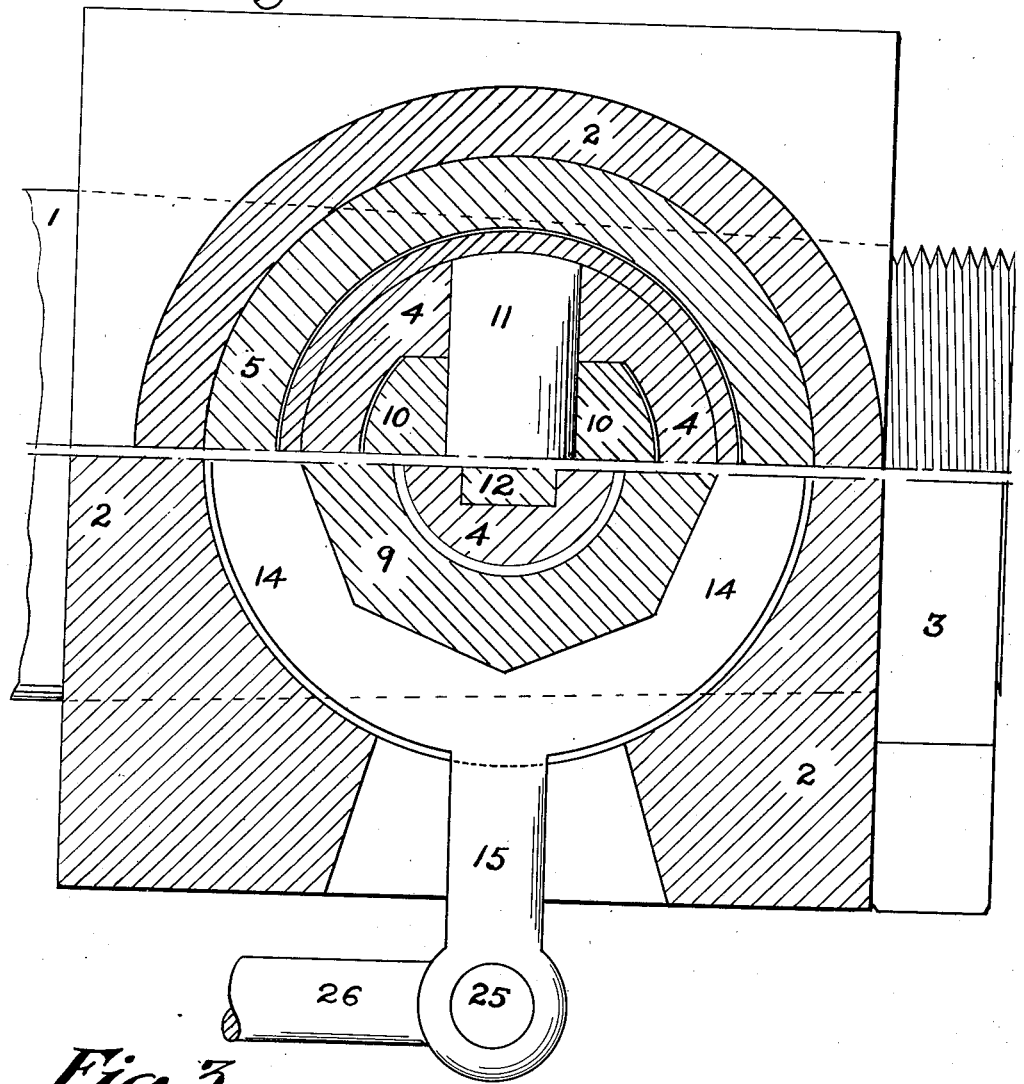
INVENTOR.
Chandley W. Lambert Patented Sept. 19, 1933

1,927,592

UNITED STATES PATENT OFFICE 1,927,592

PROPELLER HUB

Chandley William Lambert, Cleveland, Ohio

Application May 24, 1932. Serial No. 613,220

9 Claims. (Cl. 170—163)

The invention relates to improvements in propeller hubs, in which rotatably mounted blades can be turned for the purpose of controlling the pitch of the blade while in flight. One form of the invention is shown in the accompanying drawings, in which Fig. 1 is a longitudinal cross-section through the center line of the hub and blade shank and in a plane which includes the centerline of the drive shaft.

Fig. 2 is a half section on line 2—2 of Fig.

Fig. 3 is a half section on line 3—3 of Fig. 1.

Figure 1:
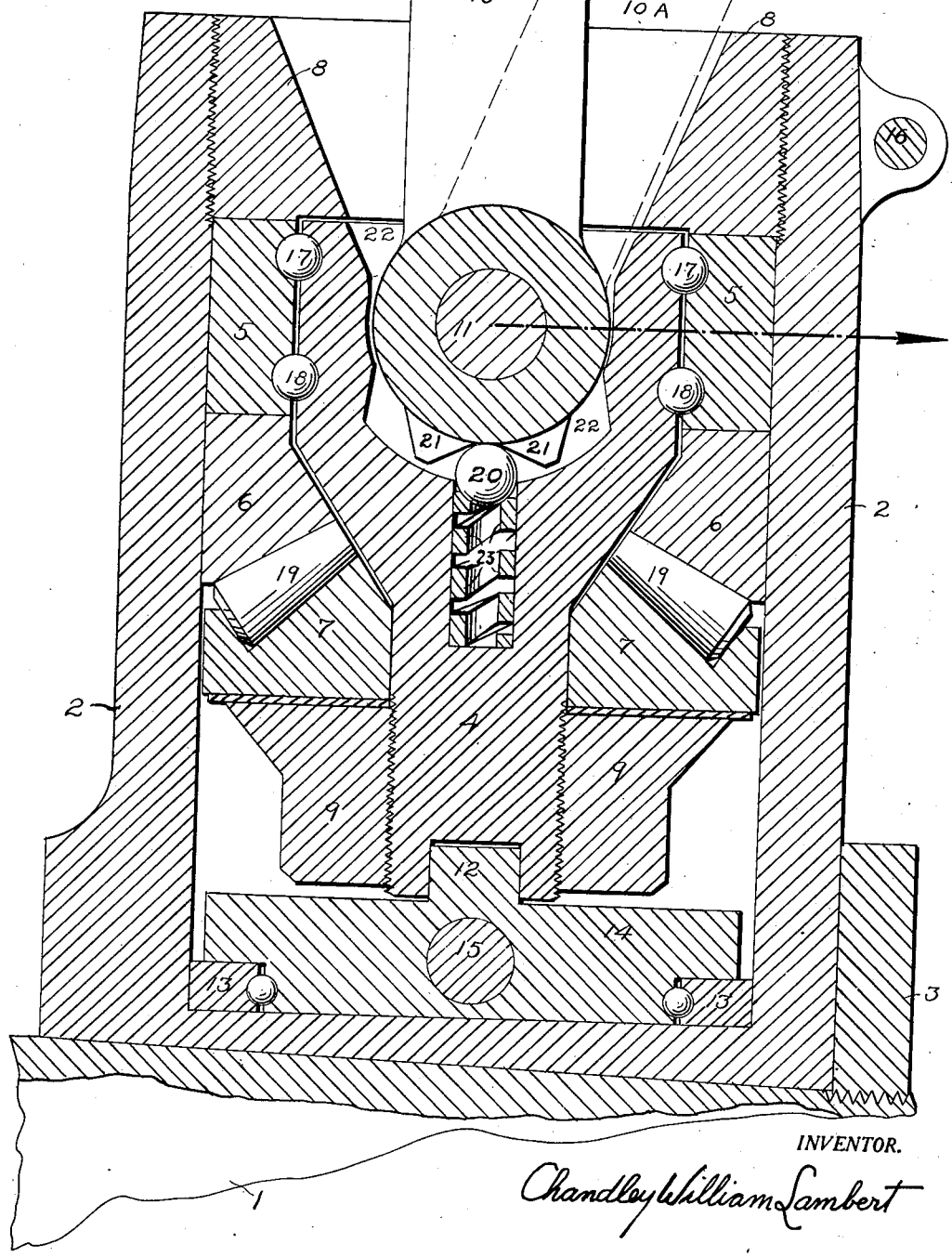

In Fig. 1, 1 is a portion of the drive shaft on which the hub 2 is secured by nut 3. 4 is the blade shank which is pivoted in hub 2 by side bearings 5—5 and balls 17—17 and 18—18 in spaced annular ball races in bearing 5—5.

Annular thrust bearings 6—6 and 7—7 and rollers 19—19 form thrust bearings, all of which bearings are secured in hub 2 by annular ring 8—8, which is further secured by a bolt through locking lugs 16, which bolt spans a narrow vertical cut 24 in the wall of hub 2. Nut 9 on shank 4 takes the end thrust due to centrifugal force acting on blade 10 and shank 4.

Blade 10 is pivoted in shank 4 by pin 11 which spans recess 22 in shank 4 in the region of the side bearings 5—5, preferably with the center of the pivot pin 11 midway between the spaced annular ball side bearing ball races 17—17 and 18—18.

Compression spring 23, recessed in shank 4, bears against ball 20 which contacts cams 21—21 on blade 10, for the purpose of holding blade 10 in an upright position when at rest.

In Fig. 2, hub 2 is secured to shaft 1 by nut 3. 4 is the shank, 5 the annular side bearing, 10 the formed stem end of the blade pivoted on pin 11 and recessed into shank 4. Nut 9 is on shank 4, into which square projection 12 of wheel 14, is fitted. Radial arm 15; secured to wheel 14 which is rotatable in annular bearings 13—13; projects outwardly through a closed slot in hub 2, and has a rearwardly extending push-pull rod 26, pivoted to it at 25. This is a means for rotating shank 4 and blade 10 in hub 2 for the purpose of changing the pitch of blade 10.

When the shaft is revolving, thrust of blade 10 causes the blade to lean forward toward the position 10A, and revolve in a wide cone. Centrifugal force acting on blade 10, tends to cause blade 10 to revolve in a plane at right angles to the center line of drive shaft 1. The resulting forward pull on the hub is straight forward from the center of pin 11 as indicated by the heavy arrow in the drawings, Fig. 1. This produces no warping in side bearing 5—5, because the pressure on balls 17 and 18 is approximately the same.

This accomplishes one object of the invention which is to reduce the power ordinarily necessitated for pitch changing while in flight.

Another object is the reduction of propeller noise due to vibration of a rigid blade.

I claim:—

1. A shaft, a radial hub secured to said shaft, spaced annular bearings cooperating with said hub, a propeller blade shank cooperating with said bearings, a transverse pivot located between said bearings on said shank, a propeller blade mounted on said pivot, and means for rotating said shank relatively to said hub, flexible dampening means cooperating with said blade and said shank.

2. A power shaft, a hollow radial hub secured to said shaft, annular side and thrust bearings within said hub, a threaded holding ring securing said bearings within said hub, means tightening said hub to further secure said ring, a shank positioned coaxially with said hub and cooperating with said bearings, means cooperating with the inner end of said shank for rotating said shank relatively to said hub, a recess in said hub within the region of said bearings, a transverse pin positioned within said recess, a propeller blade mounted on said pin, flexible means cooperating with said blade and said shank for holding said blade in a radial position relatively to said shaft when said blade and said shaft are at rest.

3. A radial propeller hub, spaced annular bearings within said hub, a rotatable propeller blade shank pivoted concentrically to said hub, a propeller blade transversely pivoted to said shank, said pivot of said blade to said shank positioned within a recess in said shank and also within said bearings in said hub, means for rotating said shank relatively to said hub, cams on the stem end of said propeller blade within said shank recess, a compression spring within said recess, said spring cooperating with said cams.

4. A propeller hub, a shank rotatable in said hub, a recess in said shank, a propeller blade transversely pivoted to said shank, the pivot of said blade to said shank positioned within said recess in said shank and also within the said hub, means for rotating said shank for the purpose of changing the pitch of said blade.

5. A drive shaft, a hub secured to said shaft, spaced bearings within said hub, a propeller blade shank rotatable in said bearings, a recess in said shank, a propeller blade pivoted to said shank, the pivot positioned transversely within said recess in said shank and also within said bearings in said hub, means for rotating said shank, flexible means for holding said blade coaxially with said shank when said blade is at rest.

6. A shaft, a hub secured to said shaft, spaced annular side and thrust bearings cooperating with said hub, a rotatable shank cooperating with said bearings, a transverse pivot pin cooperating with said shank, a propeller blade cooperating with said pivot pin, said pin positioned equidistant from the center of said shaft, as the middle region of said side bearings is also positioned therefrom, means for rotating said shank for the purpose of varying the angular pitch of said blade, flexible means for holding said blade in a radial position when at rest.

7. A hollow hub secured to a power shaft, annular side and thrust bearings cooperating with said hub and a shank positioned coaxially with said hub, a recessed opening in the end of said shank remote from said shaft, a propeller blade transversely pivoted to said shank within said recessed opening, means for rotating said shank.

8. A rotatable shank mounted coaxially with a propeller hub, a blade pivoted transversely to said shank, means for holding said blade coaxially with said shank when said blade is at rest, means for rotating said shank relatively to said hub.

9. A shaft, a hub secured to said shaft, bearings cooperating with said hub, a propeller shank rotatable in said bearings, a recess in said shank positioned within said bearings, a pin cooperating with said shank transversely of said recess, a propeller blade cooperating with said pin, spaced cams secured to said blade, flexible pressure means cooperating with said cams, a rotatable wheel cooperating with said shank, means for rotating said wheel substantially as specified.

CHANDLEY WILLIAM LAMBERT.